Oct. 31, 1967 T. E. HARRIS ET AL 3,350,018
GRINDING MILL CONTROL OR THE LIKE
Filed Dec. 16, 1963 2 Sheets-Sheet 1

INVENTORS.
THOMAS E. HARRIS
SAMUEL J. HUGHES
BY
Raymond A. Paquin
ATTORNEY.

United States Patent Office 3,350,018
Patented Oct. 31, 1967

3,350,018
GRINDING MILL CONTROL OR THE LIKE
Thomas E. Harris, Valois, Point Claire, and Samuel J. Hughes, Beaconsfield, Quebec, Canada, assignors to Dominion Engineering Works Limited
Filed Dec. 16, 1963, Ser. No. 330,789
3 Claims. (Cl. 241—34)

ABSTRACT OF THE DISCLOSURE

For controlling the load conditions within a rotary grinding mill the conveyor feed system is halted when a predetermined load has been achieved, by means of a pressure sensor connecting with the lubricant film of the plain supporting journals of the grinder drum, to sense the static pressure which is generated in the film as a function of the grinding load contained in the drum.

---

Figure 1:
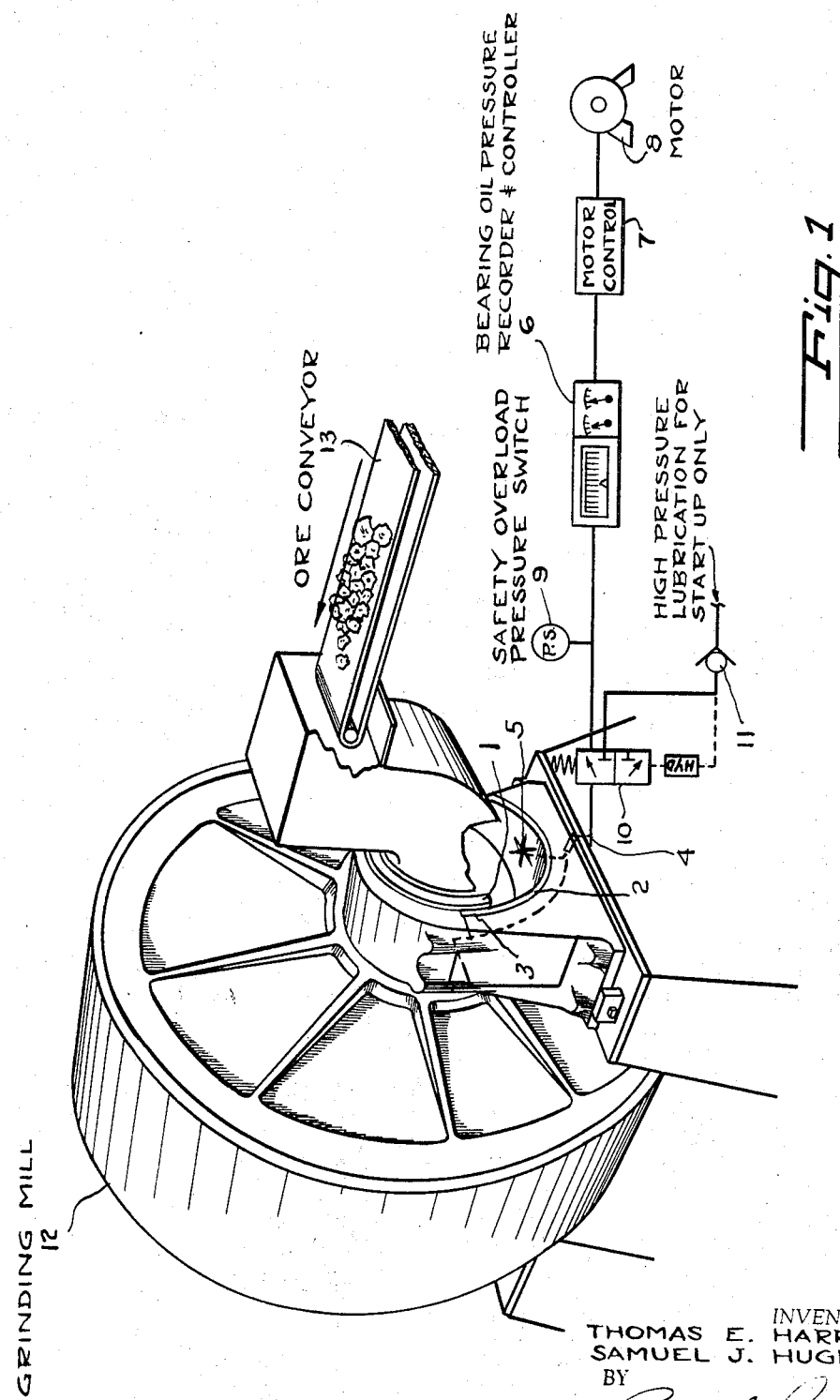

This invention relates to machines such as, by way of specific example only, autogenous and other types of grinding mills, in which the fluid pressure in the bearings is related to machine loading, and has particular reference to the provision of new and improved control and safety or overload protection means for said machines and to a new and improved method for obtaining such control and safety or overload protection.

The term machine loading as such is utilized herein shall be taken to mean any load upon the bearings of the machine and shall not be limited to mean a load contained by the machine.

Although the present invention is described in the following description with regard to its application with an autogenous grinding mill, it will be understood that such ha sbeen done for the purposes of illustration only; and that, without departing from either the scope or the spirit of the invention, it may be applied to other types of machines in which the fluid pressure in the bearings is related to machine loading.

With particular reference to autogenous grinding mills, the optimum output of a grinding mill is obtained when the level of material in the mill is at a certain specific level, which level is dependent in each case upon such factors as the composition of the material in the mill, the fineness of the ground product desired, and the like. Furthermore, in order that any particular level of material be maintained within the mill, it is necessary that the amount of material being fed into the mill be controlled.

Conventionally, this necessary control of the mill input is obtained by either sound or vibration sensitive systems, motor current systems, the measuring of the mill discharge, the measuring of the amount of material passing through some part of the mill system, or the use of weight sensitive devices. All of these types of control means, however, especially when applied to autogenous grinding mills, suffer from serious disadvantages and difficulties.

With particular reference to the sound or vibration sensitive systems, the reliability of such suffers severely due to the fact that many other factors such as the size, shape, and friability of the material in the mill, the absence or presence of water, the amount of said water, and the like, than volume affect the sound or vibration emitted by the mill.

With reference to the systems employing motor current, such systems are normally utilized for controlling rod or ball mills where the rod or ball charge is a large percentage of the total material in the mill. These systems are, however, unsatisfactory in application with autogenous grinding mills where the grinding process is achieved through the use of the material to be ground itself without the addition of rods or balls or with the addition of, at the most, small amounts of rods or balls.

Control systems employing weight sensing devices suffer severely from the requirement that that mill be especially mounted in a cradle or the like which is supported on a pressure sensitive device in that such is expensive, results in a cumbersome device, and requires that standard mill design be changed. Such, furthermore, interferes with the stability or rigidity of the bearing support, and, in some applications, arises the danger of misaligning gears and other parts.

The other system such as those employing the measurement of the mill discharge and those requiring the measurement of material passing through some part of the mill are all, by their very nature, indirect in their manner of measurement of the amount of material in the mill. Furthermore, such are generally influenced by factors not necessarily related to the amount of material in the mill and, therefore, are generally not satisfactory.

An object of the present invention is to provide a new and improved control means for controlling the operation of machines in which the fluid pressure in the bearings is related to machine loading.

Another object of the present invention is to provide a new and improved control means of the type set forth which operates such as to control the amount of material in the machine.

Another object is to provide a new and improved control means of the type set forth which operates such as to provide safety or overload protection means for the machine it accompanies.

Another object is to provide a new and improved control means of the type set forth which in no way interferes with the stability or the rigidity of the bearing support.

Another object is to provide a new and improved control means of the type set forth which can be utilized easily in applications where the bearing load is in any direction or is in varying direction with regard to the vertical centerline.

Another object is to provide a new and improved control means of the type set forth which is readily and easily adaptable for use with an autogenous grinding mill.

Another object is to provide new and improved means of the type set forth which requires no substantial change in mill design and, thus, which can be readily and easily applied to existing autogenous grinding mills.

Another object is to provide new and improved means of the type set forth which can be readily and easily serviced without substantial interference with the mill or other machine with which said means is operatively associated.

Another object is to provide new and improved means of the type set forth in which there is no possibility of misalignment of gearing or other parts.

Another object of the invention is to provide a new and improved method for obtaining control and safety or overload protection of machines in which the fluid pressure in the bearings is related to machine loading.

Other objects and advantages of the invention will be apparent from the following description taken in connection with the accompanying drawings. It will be understood that changes may be made in the details of contsruction and arrangement of parts shown and described as the preferred form of the invention has been given by way of illustration only.

Figure 2:
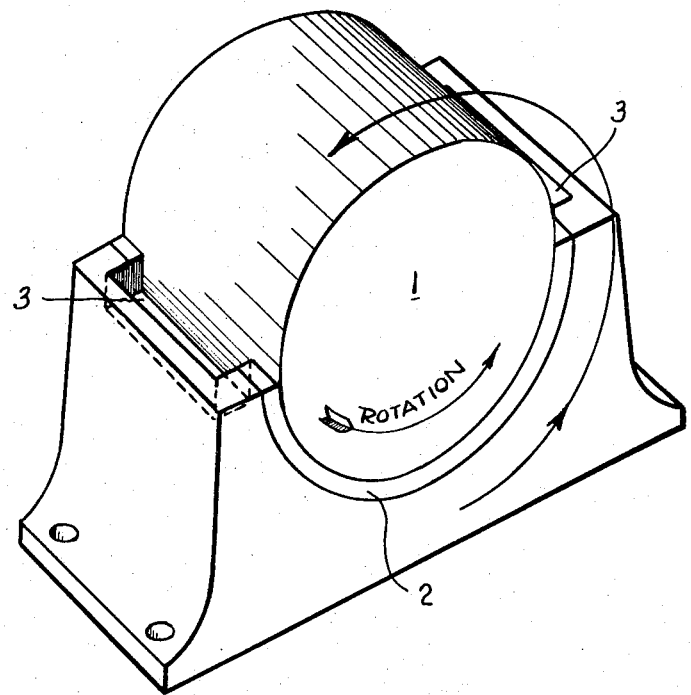

Referring to the drawings:
FIG. 1 is a schematic view illustrating one application of the present invention with reference to an autogenous grinding mill; and
FIG. 2 is a detailed view of the autogenous mill shown in FIG. 1 illustrating the circulation of lubricant therein.
Referring more particularly to the drawing wherein similar reference characters designate corresponding parts throughout, the apparatus illustrated therein comprises an autogenous grinding mill 12 containing the usual grinding chamber and fed with ore or other stock from a source of ore supply by the ore conveyor 13, the operation of said conveyor 13 being controlled by the motor 8. The rotating parts of said mill 12 are supported upon rotating journals 1 which run in babbitted bearings 2. As the load in the mill 12 is substantially downward, the bearings 2 shown in the illustrated mill encompass only the lower one-half of said journals 1.

As is shown by the arrow in FIG. 2, during the operation of said mill 12, the oil or other suitable lubricating fluid which serves as the lubricant for said mill 12 is brought from the main lubricant reservoir which is usually located below the bearings 2 to the upper portions of the journal 1. The oil then runs down or turns with said journal 1, that portion of said oil not being immediately brought between said journal 1 and said bearings 2 being retained in the lubricant reservoir 3. Overflow from said reservoir 3 and the major portion of the oil passing between the bearings 2 and the journal 1 is returned to the reservoir and recirculated in the aforedescribed manner. As is well known, the pressure in said oil increases steadily towards the maximum pressure point close to the bottom of the bearing 2 and then diminishes to zero again as it approaches the horizontal line where the babbit ends.

The babbitted bearings 2 are provided with grooves or other form of relief 5 which serve to spread lubricant provided by the tubular member or pipe 4. The pressure of lubricant in said tubular member or pipe 4 is measured by the pressure sensing element contained in the pressure recorder controller 6 which is operatively connected to the motor controller 7 for controlling the motor 8. A safety overload feature is provided by the safety overload pressure switch 9; and valve 10 serves to protect the pressure control equipment from high start-up pressure. Furthermore, check valve 11 serves to prevent loss of pressure from the babbitted bearings 2 of the mill 12 through the high pressure source when such is inactive.

After a mill such as the autogenous grinding mill 12 illustrated in the drawing has been permitted to remain idle for some time, the film of oil or other lubricant therein is largely squeezed out. Therefore, it is usual, before the starting-up of an idle mill, to force oil or other lubricant between the journal 1 and the babbitted bearing 2 in order to separate said members and, thus, to prevent possible start-up damage which otherwise might occur before the natural oil film pressure has been developed by the rotation of the journal 1.

Said forced fed lubricant is forced in between said journal 1 and said babbitted bearings 2 through the tubular member or pipe 4 which is connected to the grooves or other form of relief 5 in said bearings 2 which function such as to spread the lubricant.

With regard to any existing autogenous grinding mill, should such not include either the tubular member 4 and/or the grooves 5, such can readily and easily be added thereto without any noticeable resultant detriment to the bearings 2. Furthermore, only a small hole need be made from the tubular member 4 into the bearings 2; however, it may be preferable to somewhat widen said hole in the material comprising said bearings 2.

After the grinding mill 12 has been well started, the lubricant being fed into the bottom of the bearings 2 from the tubular member 4 is shut-off; and said mill is allowed to run on the lubricant film as previously described.

After such lubricant flow has been shut-off, the pressure in the lubricant is approximately the same in the grooves 5 in the bearings 2 as in the thin film adjacent said grooves. Said same pressure, furthermore, is also exerted the entire length of the tubular member 4, provided that there is no substantial movement of said lubricant in said tubular member 4. In absolute terms this pressure, common to the lubricant in the grooves 5, the lubricant in the film adjacent the grooves 5, and the lubricant in the tubular member 4, is a function of the weight of the rotating components of the loaded mill 12 and, thus, a function of the weight of the material or ore in said mill.

In the means provided by the present invention this lubricant pressure is utilized to activate the pressure sensing element in the pressure recorder controller 6 which automatically signals the motor controller 7 at predetermined time intervals to speed-up or slow-down the motor 8 such as to speed-up or slow-down the amount of ore or other material being fed into the mill 12 by the conveyor 13. An extra pressure switch 9 may be provided in order to add a safety overload feature to the system. Furthermore, a suitable valve 10 could be installed in order to protect the pressure control equipment from the high start-up pressure, if necessary. Check valve 11 will serve to prevent loss of pressure from the mill bearings 2 through the high pressure source when such is inactive.

Thus, it will be seen that the illustrated embodiment of the invention comprises, in brief, one apparatus for controlling the rate of feed of ore or other material into an autogenous grinding mill. From the foregoing description, furthermore, it will be seen that the illustrated embodiment of the invention may, though need not, include an overload switch which will act as a safety switch to signal to the operator or, alternatively, to shut-down or otherwise control the mill or production line.

In view of the foregoing disclosure it is believed to be apparent that there are many ways in which the lubricant pressure may be utilized to control a machine, other than that herein specifically described, without departing from either the spirit or the scope of the present invention. Said other methods of controlling a machine, it will be seen, range from the simple installation of a single pressure gauge to guide an operator in adjusting the machine or related machines, to much more complicated and complex systems which could control or influence the control of complete production lines.

Although the present invention has been heresofar described as related to a bearing, or to bearings, with ideal or "full film" lubrication, it will be understood that the invention is equally well applicable to less perfectly lubricated bearings although, in such case, the results may be less precise than with perfectly lubricated bearings. Furthermore, the invention may be applied to a machine regardless of whether the bearing comprises a complete circle or only part thereof as is shown in the drawing.

From the foregoing it will be seen that, without departing from either the spirit or the scope of the present invention, the housing may be constructed such as to rotate either instead of or in addition to the rotation of the journals.

The invenion may also be applied in applications where the lubricant is either continuously or intermittently introduced under pressure to the bearing. In such application however, the variation in pressure of the lubricant would usually be at a somewhat or, in some applications, substantially higher pressure level than in the illustrated application of the invention.

The new and improved method provided by the present invention for providing control and safety or overload protection of a machine in which the fluid pressure in the bearings is related to machine loading is believed to be apparent from the foregoing.

From the foregoing it will be seen that we have provided new and improved means for accomplishing all of the objects and advantages of the invention.

We claim:

1. In a grinding mill having a grinding drum rotatably supported by at least one journal bearing, including a lower half plain bearing in supporting relation with said journal, means to provide lubrciant to said bearing at the pressure zone thereof to provide a residual high-pressure lubricant support film in said pressure zone in supporting relation with said grinding drum journal, drum loading means including a conveyor for transferring material to said drum for grinding reduction therein, and control means for controlling the operation of said mill, the improvement comprising; pressure sensing means connected with said bearing pressure zone adjacent a position of maximum film pressure, to sense the static pressure generated by rotation of said journal on said film, and output means connecting said pressure sensing means with said mill control means in controlling relation therewith, whereby operation of said mill is controlled in accordance with variation in the pressure of said high pressure support film.

2. The grinding mill as claimed in claim 1 including over-pressure isolating means, whereby admission of high pressure lubricant to said pressure sensing means from a source independent of said lubricant provision means is precluded.

3. The grinding mill as claimed in claim 1, wherein said grinding drum is rotatably mounted on a pair of said lower half plain bearings arranged on opposite sides of the drum, said means to provide lubricant including a gravity feed reservoir located adjacent a lubricant film low-pressure zone of a said bearing, said film pressure sensing means being connected to the internal bearing surface of said plain bearing adjacent the bottom of the arc thereof, said bearing having at least one pressure distributing oil groove in a pressure transmitting contact therewith, said machine control means including a conveyor feed control to regulate the mass of material feeding to the grinding drum, whereby the mass of contents of said drum is regulated in response to bearing reaction pressures generated in reaction to the mass of said drum and said contents.

References Cited

UNITED STATES PATENTS

| | | | |
|---|---|---|---|
| 1,808,914 | 6/1931 | Bennet | 241—36 |
| 1,951,225 | 3/1934 | Weiske et al. | 241—35 |
| 2,456,074 | 12/1948 | Newhouse | 241—36 X |
| 2,766,939 | 10/1956 | Weston | 241—34 X |
| 2,929,878 | 3/1960 | Daniel | 241—301 X |
| 2,937,056 | 5/1960 | Rink | 184—1 |

WILLIAM W. DYER, JR., *Primary Examiner.*

HARRY F. PEPPER, JR., *Examiner.*

W. D. BRAY, *Assistant Examiner.*